(12) United States Patent
Weinreb

(10) Patent No.: US 6,195,690 B1
(45) Date of Patent: Feb. 27, 2001

(54) NETWORK BASED DATA ACQUISITION SYSTEM

(75) Inventor: Glenn Weinreb, Somerville, MA (US)

(73) Assignee: GW Instruments, Inc., Somerville, MA (US)

( * ) Notice: Subject to any disclaimer, the term of this patent is extended or adjusted under 35 U.S.C. 154(b) by 0 days.

(21) Appl. No.: 09/428,143

(22) Filed: Oct. 13, 1999

Related U.S. Application Data

(63) Continuation-in-part of application No. 08/642,252, filed on May 2, 1996, now abandoned.
(60) Provisional application No. 60/015,439, filed on Apr. 15, 1996.

(51) Int. Cl.[7] .................................................. G06F 15/16
(52) U.S. Cl. ........................................... 709/217; 709/224
(58) Field of Search .................................... 709/217, 200, 709/245, 252, 229, 224; 702/122, 186, 31–32; 73/660; 710/62, 69, 72; 703/14

(56) References Cited

U.S. PATENT DOCUMENTS

| 4,672,529 | * | 6/1987 | Kupersmit | 364/130 |
| 4,737,950 | | 4/1988 | Fechalos | 370/56 |
| 4,785,396 | | 11/1988 | Murphy et al. | 364/200 |
| 4,831,558 | | 5/1989 | Shoup et al. | 364/550 |
| 4,910,732 | | 3/1990 | Schwartz | 370/85.1 |
| 4,920,532 | | 4/1990 | Wroblewski. | 370/85.1 |
| 4,933,676 | | 6/1990 | Hauge et al. | 341/141 |
| 5,099,444 | | 3/1992 | Wilson et al. | 364/709.09 |
| 5,276,887 | | 1/1994 | Haynie | 395/725 |
| 5,280,477 | | 1/1994 | Trapp | 370/85.1 |
| 5,287,291 | | 2/1994 | Cuffe et al. | 364/507 |
| 5,307,066 | | 4/1994 | Kobayashi et al. | 341/155 |
| 5,307,346 | | 4/1994 | Fieldhouse | 370/85.1 |
| 5,335,186 | | 8/1994 | Iarrant | 364/550 |
| 5,386,360 | | 1/1995 | Wilson et al. | 364/146 |
| 5,394,400 | | 2/1995 | Phoy | 370/85.1 |
| 5,400,246 | | 3/1995 | Wilson et al. | 364/146 |
| 5,442,344 | | 8/1995 | Merkle et al. | 340/825.35 |
| 5,553,006 | | 9/1996 | Benda | 364/550 |
| 5,640,161 | | 6/1997 | Johnson et al. | 341/122 |
| 6,013,108 | * | 1/2000 | Karolys et al. | 792/189 |

OTHER PUBLICATIONS

"Macintosh data acquisition catalog 1993", GW Instruments, Inc.

* cited by examiner

Primary Examiner—Mehmet B. Geckil
(74) Attorney, Agent, or Firm—Wolf, Greenfield & Sacks, P.C.

(57) ABSTRACT

A data acquisition and control system includes a host computer, a controller having a processor and a network device including measurement components and control devices. The network device, which may not include a processor, is synchronously controlled by control signals from the controller communicated to the network device at times of events controlled. The communication cycle over the network includes a quiescent phase during which sensitive components settle in an electrically noise-free environment, i.e. no digital signals inside the network devices are switching during the quiescent phase.

16 Claims, 5 Drawing Sheets

NETWORK BASED DATA ACQUISITION SYSTEM

This application is a continuation-in-part of U.S. patent application Ser No. 08/642,252, filed May 2, 1996, entitled NETWORK BASED DATA ACQUISITION SYSTEM, now abandoned.

FIELD OF THE INVENTION

The present invention is in the field of data acquisition systems which measure and control electrical signals. More particularly, the invention is in the field of peripheral equipment for attachment to a computer system, e.g. a personal computer or workstation, whereby the computer and peripheral equipment may be used for data acquisition.

BACKGROUND OF THE INVENTION

The personal computer has proved to be a boon to the field of data acquisition. A personal computer is a general purpose device which may be configured by software programs and by plug-in peripheral equipment to perform a wide variety of special purpose tasks, including data reduction or computation, data acquisition and control. In the particular area of data acquisition, peripheral devices for performing measurements of physical phenomena and converting such measurements to digital signals conventionally are attached to a personal computer through an expansion bus. Messages are transmitted through the expansion bus to issue commands to instruments and to receive data back in return.

One conventional architecture for data acquisition systems includes a computer which communicates over the IEEE-488 bus with one or more processor controlled measurement instruments. The measurement instruments may include such complex devices as spectrum analyzers, as well as simpler devices, such as volt meters. However, each instrument includes a processor for communicating over the IEEE-488 bus and for controlling the instrument. Each instrument is treated in such a system as an intelligent peripheral which executes its own measurement program as directed through communication over the IEEE-488 with the computer. Processors may include microprocessors, microcontrollers, digital signal processors, etc. As a result, the instruments are expensive, consume relatively large amounts of electrical power, are designed for special measurement functions and are complex to program. Each instrument includes a processor as well as associated supporting logic and clocking circuits. The timing of communications over the bus is independent of the timing of measurements (i.e. the communications and measurement processes are asynchronous), thus increasing the exposure of sensitive instruments to digitally created noise from the bus. Therefore, special precautions must be taken in the design of such instruments to avoid electrical noise problems which could affect the measurements produced.

Another conventional approach to data acquisition systems is to attach a general purpose measurement module to a personal computer through an RS-232 or RS-422 serial port. Although such devices tend to be far less sophisticated than IEEE-488 bus based systems, the approach is substantially similar. Each measurement device has a processor within the device, for controlling the measurement components and processing commands and data to be sent or received through the RS-232 or RS-422 serial port. Measurement timing and communication functions are all controlled by the processor within each measurement device. Communication with the personal computer is achieved through the RS-232 or RS-422 serial port.

When a multiwire cable includes a signal wire carrying a signal that quickly transitions from one voltage level to another (e.g. a digital signal), a spike will inductively couple to all other wires in the cable, at each transition. In the case of a digital signal switching between 0V and 5V, 10 mV to 500 mV spikes may appear on the other signals in the cable. This means that the 10 mV to 500 mV spike is added to the other signals, and results in an error equal to the magnitude of the coupled spike. This is called cable cross-talk. Cable cross-talk may be seen in a conventional data acquisition system by grounding the most sensitive input to such a conventional data acquisition system at the sensor, far from the computer. The output of the grounded sensor should then be digitized, and viewed. The spikes discussed above will be seen in the signal viewed. This noise is added to the sensor signal even when it is not grounded, and therefore determines the maximum possible accuracy of the conventional system that has one multi-signal connector, e.g. a standard DB-25 connector, through which multiple I/O signals pass. In addition to cable cross-talk, noise can originate from ground loops, background electromagnetic fields, or the electromagnetic fields and ground noise injection generated by millions of simultaneously switching transistors inside the computer at MHZ rates. This problem of cable cross-talk affects many conventional systems because they route one or more analog and digital signals in the same cable. It should be noted that analog signals characterized by fast transitions can also cause cross-talk and noise to appear in other signals in a cable carrying such signals.

Many conventional systems suffer from one or more of the problems described above.

SUMMARY OF THE INVENTION

The present invention includes aspects which solve the various problems of the prior art indicated above, as well as other problems with conventional systems that would be evident to those skilled in this art, including but not limited to reducing cost and noise of highly accurate data acquisition systems.

In accordance with one aspect of the invention, there is provided a network based data acquisition system, comprising: a host computer having an expansion bus executing a software program to collect measurements from measurement components; a network controller subsystem in communication with the host computer through the expansion bus, the network controller having a controller synchronous serial network I/O port, the network controller including a processor executing a software program to generate control signals at the controller synchronous serial network I/O port that synchronously control the measurement components, responsive to the software program executed by the host computer; and a network device in communication with the controller synchronous serial network I/O port through a first device network I/O port, at least one component controlled through the first device network I/O port by the control signals generated by the network controller. As will be seen, the expansion bus can be a Peripheral Component Interconnect (PCI) bus, and Industry Standard Architecture (ISA) bus, a PCMCIA (PC card) bus, a NUBUS, Ethernet, Universal Serial Bus (USB) or FireWire. Generating control signals at the controller synchronous serial network I/O port at times of events controlled is sometimes referred to as real-time control or synchronous control because the control signals are made to occur at the actual time at which the event indicated by the control signals is intended to occur. Such real-time control or synchronous control is to be distinguished from the form of non-real-time control or asynchronous control where a control signal transmitted to a controlled device merely acts as a command which may be acted upon by the device at a later point in time.

In accordance with another aspect of the invention, there is provided an instrumentation system comprising an instrumentation control subsystem and a measurement subsystem including measurement components. Further in accordance with this aspect of the invention, the control subsystem and the measurement subsystem are interconnected by an instrumentation bus having: in the instrumentation control subsystem a communication device having an output carrying a control signals communicated to the measurement subsystem to synchronously control the measurement components; and in the measurement subsystem a communication device having an input which receives the control signal which synchronously controls the measurement component.

Finally, in accordance with yet another aspect of the invention, there is a method of controlling measurement instruments comprising the steps of: interconnecting a control system with a measurement system through a digital bus; controlling the measurement system through a series of signals sent via the digital bus during a signaling part of a communication cycle; and sampling measurements during a quiescent part of the communication cycle. In accordance with this aspect of the invention, the quiescent part of the communication cycle permits settling of sensitive analog components in a substantially electrically noise-free environment. Therefore, measurements made by this system may be accurate and noise-free to within tens of microvolts using low cost components and without expensive shielding techniques.

BRIEF DESCRIPTION OF THE DRAWINGS

In the drawings, in which like reference numerals designate like elements.

DETAILED DESCRIPTION

An embodiment of the invention and several variations are now described illustrating various aspects of the invention. The invention will be better understood upon reading the following description along with the drawings.

Figure 1:
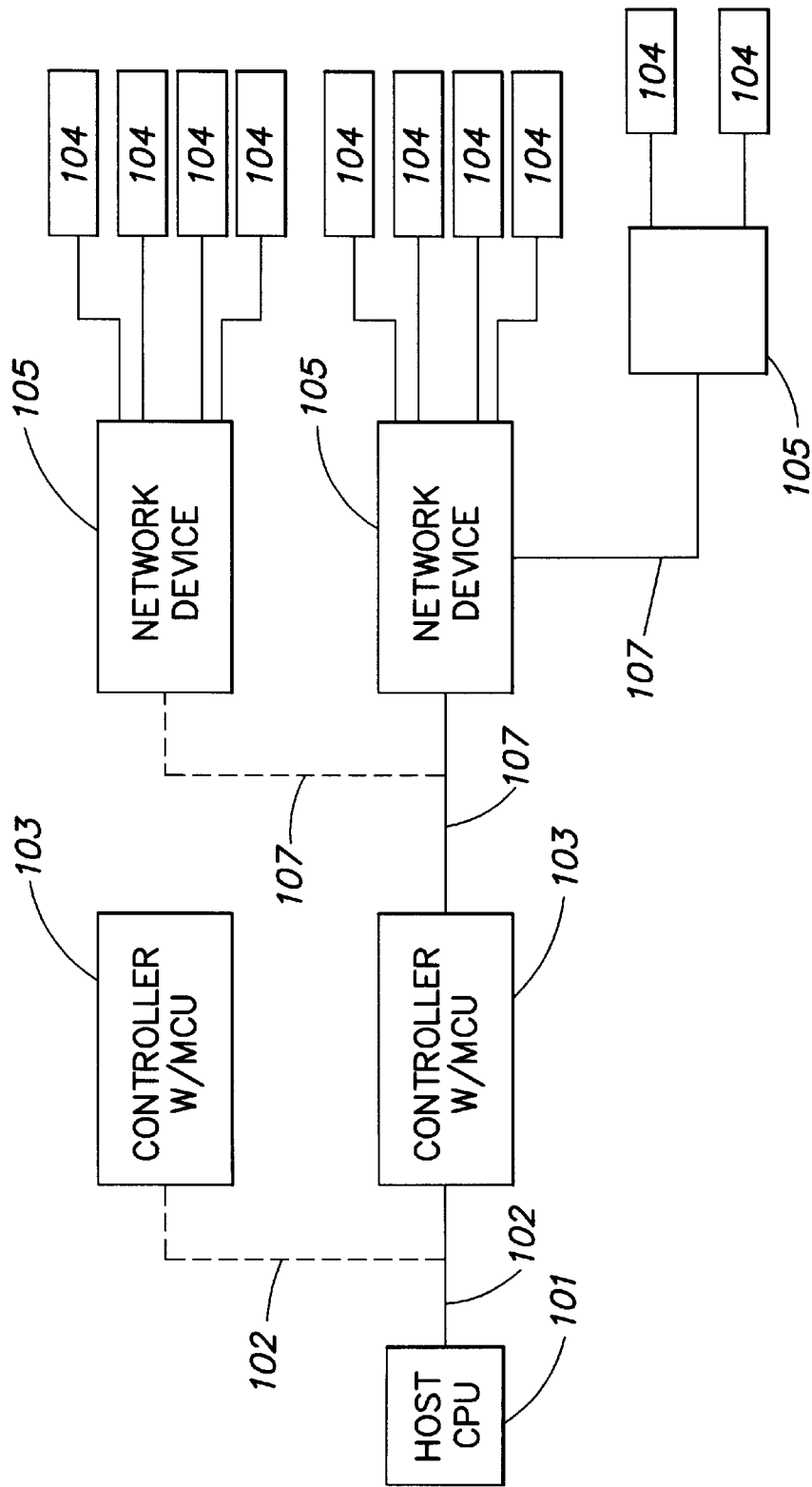
FIG. 1 is a high level block diagram of a data acquisition system according to one aspect of the present invention.

As shown in FIG. 1, one embodiment of the invention is a data acquisition system including a host computer system 101, a controller 103 in communication with the host computer 101 and a network device 105, for example a measurement system, in communication with the controller 103. I/O subsystems 104, for example having analog inputs, analog outputs, digital inputs and/or digital outputs are included within or attached to the network device 105. In one embodiment, the I/O subsystem 104 are permanently attached; whereas in another, they are pluggable cards. The data acquisition system is controlled by a software program executed by the host computer system 101. This software program receives inputs from an operator or other input sources (not shown) and processes those inputs to control operation of the network device 105 in the manner directed by the inputs received. The software program also receives data from the network device 105 and produces outputs which may be readable by a human operator or may be in a form useable by other software programs or equipment (not shown). These control and processing functions involve interactions with a human operator that are not required to occur at predetermined times or intervals or within a certain time of operator intervention. For example, an operator may set up an experiment in advance of the occurrence of the physical phenomena to be measured, in which a series of measurements are taken and recorded on disk for later manipulation. Only the series of measurements are of a time-critical nature, since they must occur at fixed times or intervals during or relative to the phenomena to be measured.

In this embodiment of the invention, the host computer 101 may be any self-contained personal computer (PC), workstation or more powerful computer system having adequate speed, memory and I/O capabilities for the data acquisition task intended. Particularly suitable computer systems include IBM PC or compatible personal computers employing an Intel 80486, Pentium or newer central processing unit (CPU), or the equivalent, running the Windows 95, 98 or NT operating system or a newer operating system providing similar resources; and Motorola 680X0-based Apple Macintosh and Power PC Apple Macintosh systems, or the equivalent, running MacOS System 7 or newer. Other CPUs and operating systems could also be used. The controller 103 may communicate with the host computer through a standard expansion bus 102, such as a PCI bus, an ISA bus, a PCMCIA (PC Card) bus, a NUBUS, Ethernet, USB or FireWire. Communication between the controller 103 and the network device 105 is through a network bus 107 described further below. In some embodiments, the host computer 101, together with the controller 103 are a self-contained unit; in others, the controller 103 is contained within the device 105. The network devices 105, and the network bus 107 used to communicate with them, are external to the host computer 101.

Figure 2:
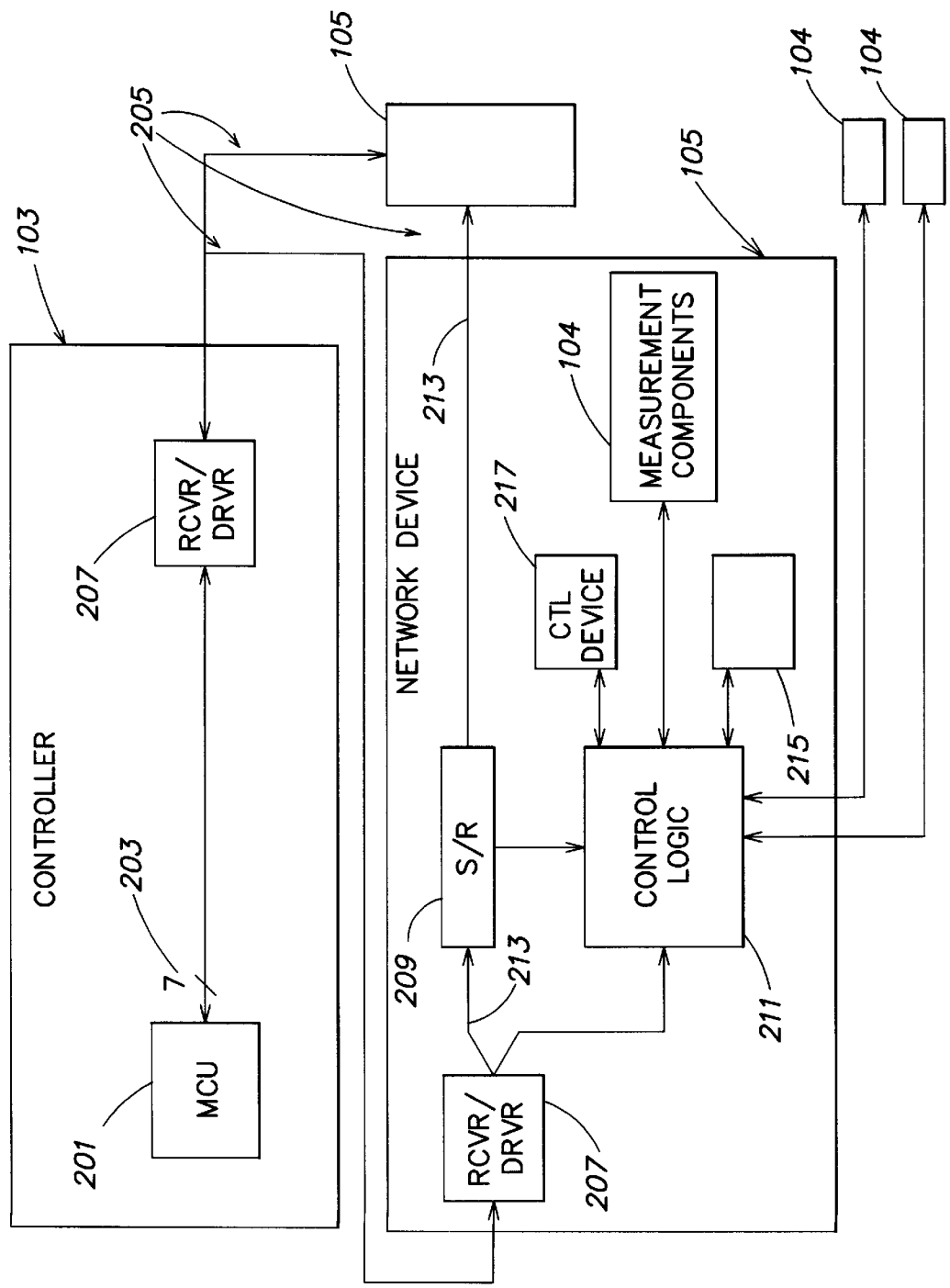
FIG. 2 is a more detailed block diagram of the aspect of the present invention shown in FIG. 1.

Additional details of the network bus 107 are now described in connection with FIG. 2. The network bus 107 includes both serial and parallel digital signal components, as will be seen. Preferably, the network bus 107 is exclusively digital, carrying no analog signals. By keeping analog signals off of the network bus 107, the digital signals carried by the network bus 107 are less likely to induce noise into sensitive analog measurements.

In a presently preferred embodiment, the controller 103 includes a Motorola 68332 microcontroller unit (MCU) 201 which controls operation in real time of all network devices 105 in communication with the controller 103, responsive to instructions received from the host computer (FIG. 1, 101). In this context, real-time control includes those control and communication functions which are required or desired to occur at predetermined times or scheduled intervals, without variation. The MCU 201 also formats data received from the network device 105 for transfer to the host computer software program as digital signals carried over the network bus 107. In addition, the preferred Motorola 68332 MCU 201 includes a proprietary Queued Serial Peripheral Interface (QSPI) port 203. The QSPI port 203 forms the basis of the hardware layer of the digital network bus 107 through which the network device 105 and the controller 103 communicate. The QSPI port 203 of the MCU 201 on the controller 103 is connected to a network cable or backplane 205, in some embodiments through simple buffer and drive circuits 207. The buffer/driver circuits 207 may be RS-422 differential line drivers/receivers, RS-485 differential line drivers/receivers, CMOS logic or TTL logic, for example. As described below, all of the sequential digital circuits (except for shift registers to receive the serial input), clocks and other electrically noisy components required to control the network device 105 are kept away from the sensitive I/O subsystem. The network device 105 contains only the shift registers 209, and simple combinatorial logic circuits 211 to communicate signals through the network 205. The network device 105 contains no transformers, no oscillators, and no processors which could create internal electromagnetic fields, ground bounce, or other electrical noise. The controller 103 may reside within the host computer chassis (not shown) as a plug-in accessory board, for example, while the network device 105 may be located at a distance, e.g., 1 ft.–4,000 ft., from the host computer (FIG. 1, 101). The useful range of distances is determined by the electrical characteristics of the network bus 107 and the cable and components used in its construction. In other embodiments, the controller 103 is in the same enclosure as the network device 105, isolated in its own cavity.

As noted above, the instrument network (FIG. 1, 107) is electrically based on the seven signals of the Motorola QSPI interface 203. Although the network 107 is described in terms of the QSPI interface standard, other interfaces could be used. The QSPI interface 203 includes the following signal:

| SIGNAL NAME | SIGNAL FUNCTION |
| --- | --- |
| sClk | Serial clock output |
| sDout | Serial data output |
| sDin | Serial data input |
| A0 | Address line 0 |
| A1 | Address line 1 |
| A2 | Address line 2 |
| A3 | Address line 3 |

The above seven signals are transmitted to all network devices 105 in parallel. They are native signals of the Motorola 68332, However, in some embodiments they are transmitted through the network bus (FIG. 1, 107) via standard RS-422 transmitters and receivers 207 connected to the cable 205, and are thus transmitted through a cable 205 over two wires each, differentially.

The network bus (FIG. 1, 107) further includes several signals not found in the Motorola 68332 QSPI port. These are four power signals including +5 V, +12 V, –12 V and ground, as well as an sDout_select signal 213 derived from sDout. The sDout_select signal is connected in daisy chain fashion to each of the shift registers 209, as described above.

Using the QSPI port 203, the controller 103 achieves synchronous real-time control over the network device 105, including any measurement components 104 and control devices 217 connected thereto. Such measurement components 104 and control devices 217 may include digital-to-analog (D/A) converters, analog-to-digital (A/D) converters, digital input registers, digital output registers and serial EEPROMs, for example. Commands received from the host computer (FIG. 1, 101) by the controller 103 are of a general set-up nature. Software executing on the controller MCU 201 compiles the host computer commands into QSPI commands which place sequences of bits onto a stack within the 68332 MCU 201. The QSPI then takes the sequences of bits from the stack and assembles them into a sequence of bits issued through the QSPI port 203 of the 68332 MCU and drives them to the network device 105 over the network bus 107 as described below.

Figure 3:
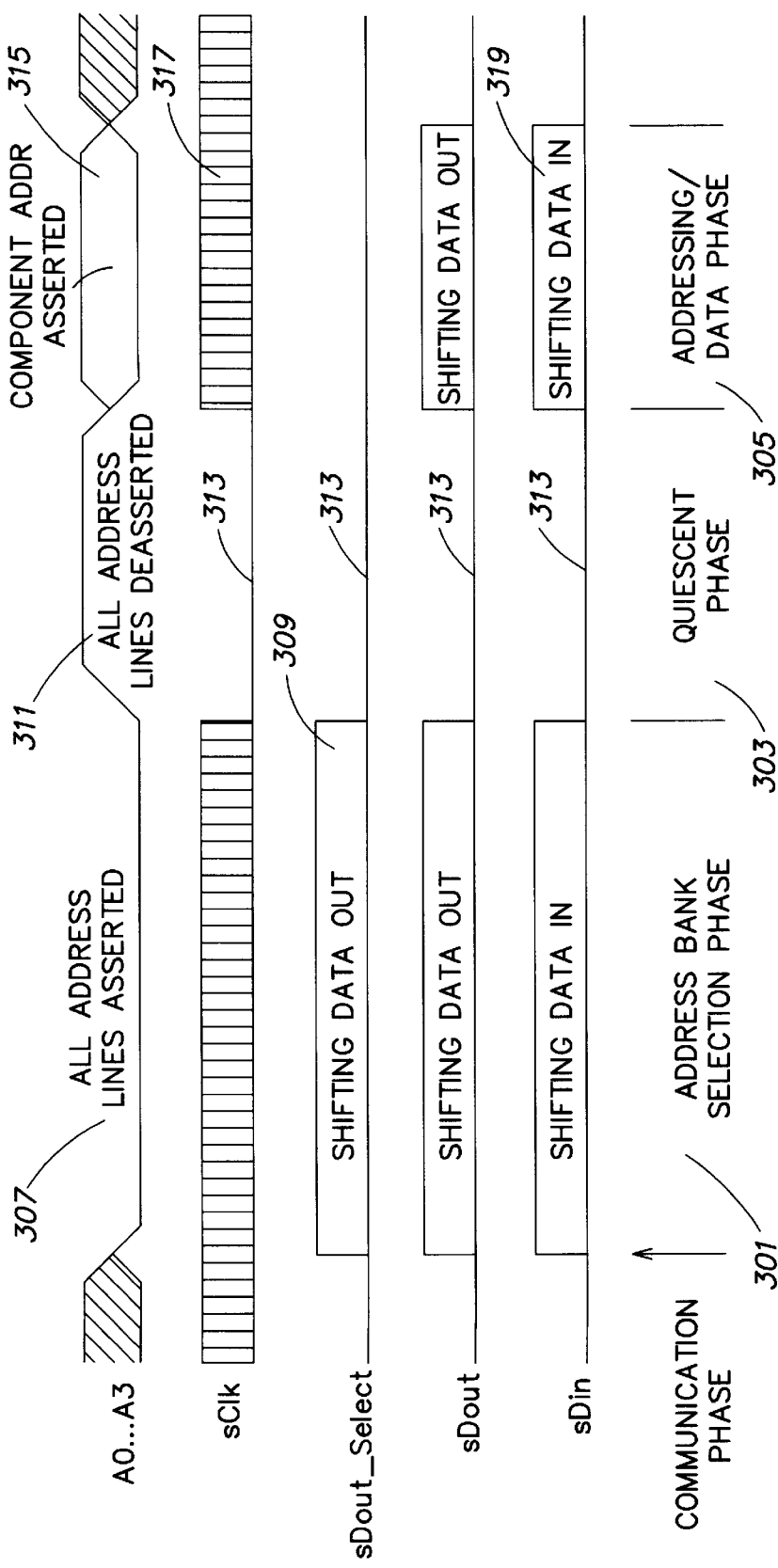
FIG. 3 is a timing diagram representing communication over an instrumentation network in accordance with another aspect of the present invention.

Synchronous control of measurement and control components 104 and 217, over the network bus 107 network device 105, is achieved by using a communication cycle as shown in the timing diagram of FIG. 3. The communication cycle has three phases. One phase is an address bank selection phase 301, during which selection of network devices to be addressed is performed. This phase is optional if the target device is already among those previously selected for addressing. The second phase is a quiescent phase 303, during which analog measurement sampling is performed. During the quiescent phase, there is no switching of any signal in the I/O subsystem (FIG. 1, 104), for example allowing high gain amplifiers to settle in an absence of digital noise sources. The third phase is an addressing and data phase 305. The network bus (FIG. 1, 107) signals resume, for example, causing sample/hold amplifiers to switch to hold mode and A/D converters to produce their digital outputs. An example of the cycle is now described. In the first phase, all address lines are asserted 307, the sDout_ select line carries the sequence of bits issued by the QSPI 309. The sequence of bits issued during this time causes one network device to be selected. The communication then moves into the second phase 303, by deassertion of all the address lines A0 . . . A3 311. The clock sClk and all serial communication in both directions is halted 313 during this quiescent phase. During this time, sample/hold (S/H) circuits and amplifiers connected to receive analog measurements are allowed to settle in a noise-free environment. Finally, communication moves to the third phase 305. An address of one measurement component (FIG. 2, 104) or control device (FIG. 2, 217) connected to the previously selected network device 105 is asserted 315. The selected component address, combined with the restarted sClk signal 317 causes an event indicated to occur in the controlled component. For example, if the controlled component is an A/D converter, the S/H amplifier changes to hold mode and the corresponding analog-to-digital (A/D) converter begins converting the held value to a digital signal. This digital signal is then shifted into the controller on the sDin line 319.

Components, 104 and 217, controlled as described above may include switches, A/D converters, D/A converters, S/H amplifiers, serial EEPROMS, etc. The communication cycle involves the reading and writing of data to and from components attached to a network device. Such reading and writing of data could result in the setting of voltages, reading of voltages, setting of digital bits, and reading of digital bits. The type of measurement and control of which the network device may be capable is unlimited, including at least such basic parameters as voltage, current, temperature, pressure, etc. The type of measurement and control may also include more complex parameters, such as blood pressure, and those requiring significant preprocessing before being communicated to or from the host computer.

Network devices are located in close physical proximity to such components as sensors or signal sources, and signal conditioning amplifiers are placed in the network devices next to screw terminal inputs for the input signals. Therefore, noise is significantly reduced as compared to conventional systems, since there is no cable cross-talk and no noise picked up by a long signal wire carrying a low-level analog signal running from a remote sensor back to a data acquisition board, as done in some conventional systems.

The described embodiment of the invention has been constructed and has been shown to produce significantly lower noise measurements than prior art systems. In the described embodiment, a combination of low cost and accuracy in a range of a few microvolts is achieved due in part to the use of the invention. The described embodiment is capable of sustaining aggregate sample rates of over 100 K samples/sec. The aggregate rate may be distributed over a large number of channels, e.g. up to 512 channels, or dedicated to support of a single, high-speed channel. If several measurement channels are supported, different sample rates may be used with each. Also, different integration times, analog filters and digital filters, e.g. high pass, low pass, band pass, and band stop filters, may be inserted in each channel. Since measurement control is exercised by the controller MCU without intervention of the host computer, accurate real-time sample timing is achieved without interfering with host computer operations.

Figure 4:
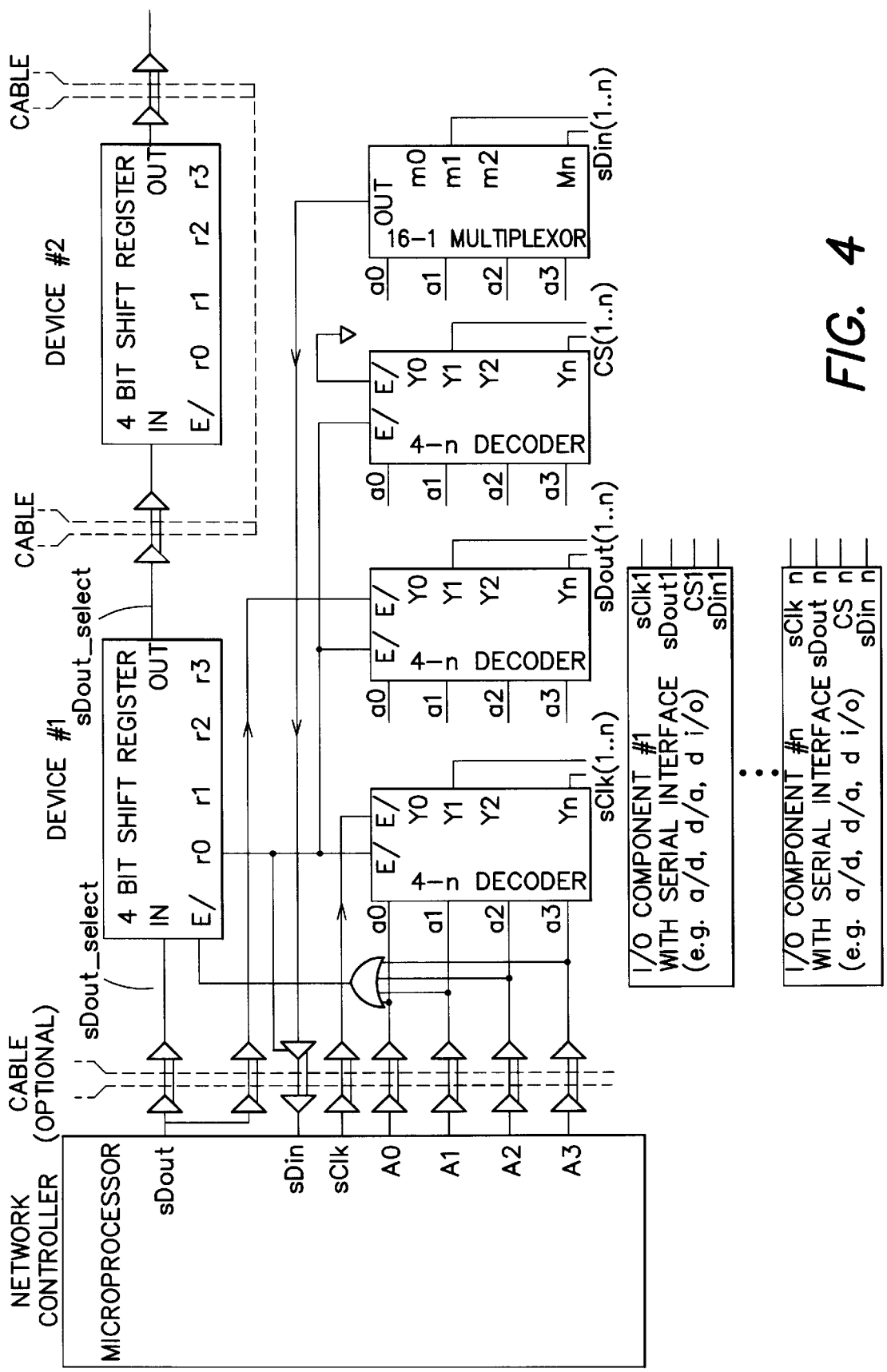
FIG. 4 is a detailed circuit diagram of the aspect of the system of FIG. 2.

The controller may be connected to a plurality of network devices through the network 107. In some embodiments, a network including a plurality of network devices is configured in daisy chain fashion as shown in FIG. 4.

An example of performing a voltage measurement using the controller and network device is now given. The procedure is substantially the same for reading any component 104 contained in or connected to the network device, including for example a serial EEPROM, A/D converter, D/A converter, digital input register or digital output register.

First the network device to which the component (here assumed to be an A/D converter) is connected is selected. A select stream is transmitted through the sDout_select line in which one or more bits is asserted to select one network device. The select stream is serially shifted on sDout_select into the chain of shift registers. A quiescent mode then occurs, during which the S/H amplifiers settle. Next, the serial data is transferred by first asserting a component address on A0 . . . A3 and then performing a synchronous serial transfer using sClk, sDin and sDout. Assertion of a component address causes the S/H amplifiers to enter hold mode and the A/D converter to begin conversion.

Transmission of the select stream as discussed above is enabled by asserting all four address lines A0 . . . A3, and shifting the select stream through the sDout_select line to the sequentially connected shift registers. In the described embodiment, each network device includes one four-bit shift register. When all four address lines A0 . . . A3 are deasserted, then sClk and sDout are disabled, so that there is no switching of any signals on the network. Since no signals are changing state on the network cable or in the network device, no electric fields or current spikes are coupled into the sensitive analog components of the network device. Therefore, communication noise is not coupled into the measurement made, because this quiescent time is used to allow the high gain amplifier and sample/hold circuits of a measurement component including such circuits to settle. When the address of a measurement component including S/H circuits is next asserted, the sample/hold circuits immediately change to hold mode. This transition occurs before the resumption of communication on the network bus, and therefore the settled accuracy of the measurement is retained.

The present invention provides significant advantages over conventional data acquisition plug-in boards. In particular, the above-described configuration provides a few microvolts of accuracy, rather than tens of millivolts of accuracy using conventional data acquisition plug-in boards. This substantial difference arises through:

internal signal conditioning amplifiers for each channel;
sensitive analog electronics isolated in electrically quiet network devices, while noisy digital circuitry is left in the host computer;
network devices placed in close physical proximity to sensors, avoiding routing sensitive analog signals across a room on wires which act as antennae;
not placing analog signals in multiwire cables with other signals, which can result in tens of millivolts of crosstalk; and
not pumping current from analog inputs of the analog input amplifiers into the sensitive analog signal source, such as done by multiplexors on conventional data acquisition boards, which can result in horrible spikes, especially with high impedance sources.

Due to the higher accuracy achieved by the present invention, direct connections can be made to sensors such as thermocouples, RTDs, strain gauges, resistance sources, current sources, and voltage sources at lower cost than conventional systems. The inventive architecture permits the system to digitize any number of channels, each at their own sample rate, their own range, their own integration time, and their own analog low pass filter setting. The architecture also permits digital filtering of each channel with their own low pass, high pass, band pass, or band stop filters. The present invention achieves very low cost relative to a conventional data acquisition board which must include external signal conditioning amplifiers to avoid as much of the problems of such systems as possible. In the present invention, real-time tasks are off-loaded to a microcontroller on the controller board. Therefore the host computer is not burdened with real-time tasks, such as causing each measurement to be taken at the proper interval.

In one, presently preferred variation, the network devices 105 can be preconfigured and fixed to perform specific desired I/O functions, or can be flexible card cage systems which accept various plug-in measurement components 104, including devices such as solid state relays, optically isolated analog and digital inputs and outputs, digital I/O lines, 240VAC on/off control, anti-aliasing filters, low-level low-noise analog inputs, analog voltage and current outputs, 0–20 mA outputs and 0–20 mA inputs. Network devices 105 can include an internal analog bus, so plural analog signals can be routed through one A/D or D/A convertor. However, all communication with the host computer 101 over expansion bus 102 is by digital signals.

Figure 5:
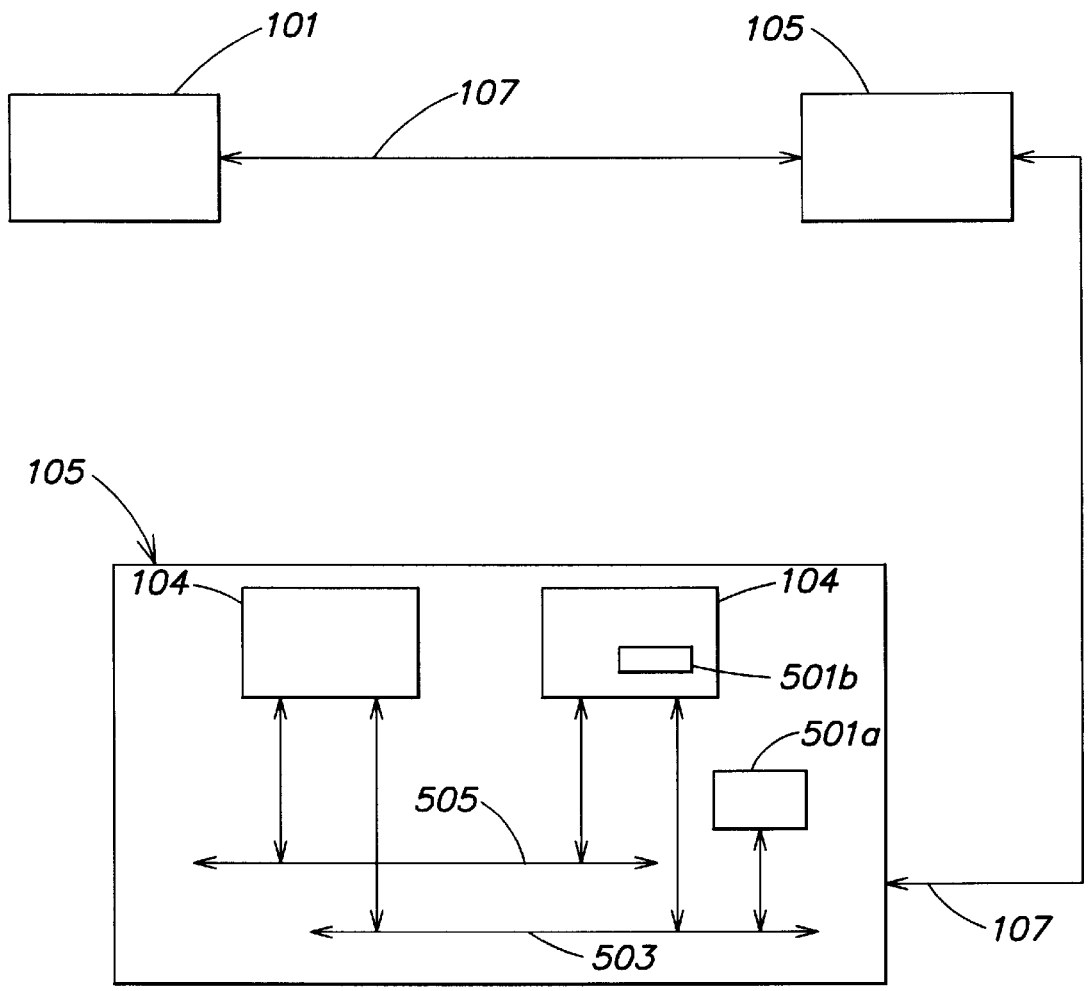
FIG. 5 is a block diagram showing components of the network device.

As shown in FIG. 5, a self-contained host computer 101 communicates with plural network devices 105 over a serial, daisy-chained digital network bus 107. Within each network device 105 reside measurement components 104. In this embodiment, measurement components 104 may be interchangeable plug-in units, or network device 105 may be permanently preconfigured with particular measurement components 104. The network device 105 can include one A/D and/or D/A 501a connected to the measurement components 104 through an analog bus 503. All measurement components 104 have access to the A/D and/or D/A 501a through the analog bus 503 on a time-multiplexed or interrupt driver basis, as desired. Alternatively, one measurement component 104 can include an A/D and/or D/A 501b to which all measurement components 104 have access through analog bus 503. Analog bus 503 is entirely contained within network device 105, where it can be shielded from externally induced noise. Command and control, as well as data I/O signals transmitted to network devices 105 are communicated within the measurement components 104 over digital bus 505. Digital signal timing is as described above in connection with FIG. 3.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto and equivalents thereto.

What is claimed is:

1. A network based data acquisition system, comprising:
   at least one measurement component;
   a host computer having an internal expansion bus, the host computer executing a software program to collect measurements from the measurement component;
   a network controller subsystem in the host computer and connected thereto through the internal expansion bus, the network controller having a digital controller network I/O port, the network controller including a processor executing a software program to generate digital control signals at the digital controller network I/O port that control the measurement component responsive to the software program executed by the host computer, the network controller subsystem causing the digital control signals controlling the measurement component to sequentially enter a communications phase during which the digital control signals vary and a quiescent phase during which the digital control signals do not vary and the measurement component performs a measurement;
   an exclusively digital network bus connected to the controller network I/O port, the exclusively digital network bus carrying the varying digital control signals absent any analog signals during the communications phase and no varying signals during the quiescent phase; and
   a network device external to the host computer and having a digital device network I/O port connected to and in communication with the exclusively digital network bus, the network device further having a measurement I/O port connected to at least one measurement component controlled by the digital control signals generated by the network controller and carried by the exclusively digital network bus.

2. The system of claim 1, wherein the controller synchronous serial network I/O port and the device network I/O port communicate through a bus, comprising:
   a plurality of address signals; and
   at least one serial data signal; wherein
   when one address signal is asserted an address bank is selected, when another address signal is asserted the quiescent phase is entered, and when neither address signal is asserted a device is addressed for transfer of data.

3. The system of claim 2, further comprising a shift clock, the shift clock suppressed during the quiescent phase.

4. The system of claim 3, wherein signals in the host computer are not suppressed during the quiescent phase.

5. The system of claim 1, wherein plural network devices are interconnected through respective network I/O ports.

6. The system of claim 1, wherein at least one network device further comprises:
   an internal analog data bus.

7. The system of claim 6, wherein at least one network device further comprises:
   not more than one A/D converter connected to the measurement component through the analog bus, having an output producing digital data signals carried on the exclusively digital network bus.

8. An instrumentation system comprising:
   a computer-implemented instrumentation control subsystem; and
   a measurement subsystem separate from the instrumentation control subsystem, the measurement subsystem including measurement components;
   the control subsystem and the measurement subsystem interconnected by an exclusively digital instrumentation bus lacking analog signals, the exclusively digital instrumentation bus having:
      in the instrumentation control subsystem a communication device having an output carrying a digital control signal communicated to the measurement subsystem to control the measurement components and a communication controller establishing a control signal cycle having a communication phase and a quiescent phase, the digital control signal periodically entering the communication phase during which the digital control signal varies and the quiescent phase during which the digital control signal does not vary; and
      in the measurement subsystem a communication device having an input which receives the digital control signal and which synchronously controls the measurement component to perform a measurement during the quiescent phase.

9. The system of claim 8, further comprising a shift clock synchronizing communication of the control signal.

10. The system of claim 9, wherein the instrumentation system further comprises at least one signal source not suppressed during the quiescent phase.

11. The system of claim 8, wherein plural measurement subsystems are connected to communicate the control signal through a daisy-chain configuration.

12. The system of claim 2, wherein at least one network device further comprises:
   an internal analog data bus.

13. The system of claim 12, wherein the at least one network device further comprises:
   not more than one A/D converter connected to the output producing digital data signals carried on the exclusively digital network bus.

14. A method of controlling measurement instruments comprising steps of:
   isolating a control system from a measurement system by separately housing the control system and the measurement system, which are interconnected through an exclusively digital bus;
   establishing a communication cycle over the exclusively digital bus, the communication cycle having a signaling part during which only digital communication occurs over the exclusively digital bus and a quiescent part during which no communication occurs over the exclusively digital bus;
   controlling the measurement system through a series of signals sent via the digital bus during the signaling part of the communication cycle; and
   sampling measurements during the quiescent part of the communication cycle.

15. The method of claim 14, further comprising a step of:
   continuing processing of independent signals within the control system during the quiescent phase.

16. The method of claim 15, further comprising a step of:
   converting analog measurements into digital data signals before formatting them to the control system through the exclusively digital bus.

* * * * *